(12) United States Patent
Loose et al.

(10) Patent No.: US 7,367,886 B2
(45) Date of Patent: May 6, 2008

(54) GAMING SYSTEM WITH SURROUND SOUND

(75) Inventors: Timothy C. Loose, Chicago, IL (US); Eric M. Pryzby, Skokie, IL (US); Wayne H. Rothschild, Northbrook, IL (US)

(73) Assignee: WMS Gaming Inc., Waukegan, IL (US)

( * ) Notice: Subject to any disclaimer, the term of this patent is extended or adjusted under 35 U.S.C. 154(b) by 693 days.

(21) Appl. No.: 10/345,787

(22) Filed: Jan. 16, 2003

(65) Prior Publication Data

US 2004/0142748 A1    Jul. 22, 2004

(51) Int. Cl.
*A63F 9/24* (2006.01)
(52) U.S. Cl. .............. 463/35; 463/20; 463/35
(58) Field of Classification Search ............ 463/20–30, 463/35–37
See application file for complete search history.

(56) References Cited

U.S. PATENT DOCUMENTS

| | | | | |
|---|---|---|---|---|
| 3,533,629 A | | 10/1970 | Raven ..................... 463/18 |
| 3,628,829 A | * | 12/1971 | Heilig .................... 297/217.4 |
| 4,522,399 A | | 6/1985 | Nishikawa ............. 273/143 R |
| 5,133,017 A | | 7/1992 | Cain et al. .................. 381/71 |
| 5,143,055 A | * | 9/1992 | Eakin ....................... 601/47 |
| 5,199,075 A | * | 3/1993 | Fosgate .................... 381/20 |
| 5,259,613 A | | 11/1993 | Marnell, II ................ 273/138 |
| 5,307,418 A | * | 4/1994 | Sumitani .................. 381/307 |
| 5,318,298 A | | 6/1994 | Kelly et al. ............. 273/122 R |
| 5,370,399 A | | 12/1994 | Liverance ................ 273/434 |
| 5,444,786 A | | 8/1995 | Raviv ......................... 381/71 |
| 5,469,510 A | | 11/1995 | Blind et al. ................. 381/55 |
| 5,524,888 A | | 6/1996 | Heidel ......................... 43/21 |
| 5,533,727 A | | 7/1996 | DeMar ........................ 463/23 |
| 5,542,669 A | | 8/1996 | Charron et al. ............. 463/13 |
| 5,594,800 A | * | 1/1997 | Gerzon ....................... 381/20 |
| 5,633,993 A | * | 5/1997 | Redmann et al. .......... 345/419 |
| 5,655,961 A | * | 8/1997 | Acres et al. ................. 463/27 |
| 5,695,188 A | | 12/1997 | Ishibashi ................ 273/143 R |
| 5,743,798 A | | 4/1998 | Adams et al. ............... 463/17 |
| 5,762,552 A | | 6/1998 | Vuong et al. ................ 463/25 |
| 5,775,993 A | | 7/1998 | Fentz et al. ................. 463/17 |
| 5,807,177 A | | 9/1998 | Takemoto et al. .......... 463/47 |
| 5,816,918 A | | 10/1998 | Kelly et al. ................. 463/16 |
| 5,828,768 A | | 10/1998 | Eatwell et al. ............ 381/333 |

(Continued)

FOREIGN PATENT DOCUMENTS

AU    199943487    3/2000

(Continued)

OTHER PUBLICATIONS

Weint, Joe. Entertainment Vehicles, IGWB New '97 Games, Mar. 1997, pp. 11-12, 15-18.

(Continued)

*Primary Examiner*—Robert Pezzuto
*Assistant Examiner*—Sunit Pandya
(74) *Attorney, Agent, or Firm*—Nixon Peabody LLP

(57) ABSTRACT

An electronic gaming system comprises a gaming terminal and a speaker arrangement. The gaming terminal conducts a wagering game. The speaker arrangement emits audio associated with the wagering game in surround sound relative to a player in front of the gaming terminal.

42 Claims, 8 Drawing Sheets

U.S. PATENT DOCUMENTS

| | | | | |
|---|---|---|---|---|
| 5,833,538 | A | 11/1998 | Weiss | 463/21 |
| 5,838,808 | A * | 11/1998 | Prosser | 381/388 |
| 5,851,148 | A | 12/1998 | Brune et al. | 463/25 |
| 5,941,773 | A | 8/1999 | Harvel | 463/16 |
| 5,971,850 | A | 10/1999 | Liverance | 463/23 |
| 6,068,552 | A | 5/2000 | Walker et al. | 463/21 |
| 6,089,663 | A | 7/2000 | Hill | 297/258.1 |
| 6,110,041 | A | 8/2000 | Walker et al. | 463/20 |
| 6,162,121 | A | 12/2000 | Morrow et al. | 463/16 |
| 6,217,448 | B1 | 4/2001 | Olsen | 463/25 |
| 6,254,483 | B1 | 7/2001 | Acres | 463/26 |
| 6,302,790 | B1 | 10/2001 | Brossard | 463/20 |
| 6,308,953 | B1 | 10/2001 | Nagano | 273/143 R |
| 6,315,666 | B1 | 11/2001 | Mastera et al. | 463/31 |
| 6,368,216 | B1 * | 4/2002 | Hedrick et al. | 463/20 |
| 6,416,411 | B1 | 7/2002 | Tsukahara | 463/35 |
| 6,422,941 | B1 | 7/2002 | Thorner et al. | 463/30 |
| 6,471,589 | B1 | 10/2002 | Nagano | 463/21 |
| 6,487,296 | B1 * | 11/2002 | Allen et al. | 381/80 |
| 6,530,842 | B1 * | 3/2003 | Wells et al. | 463/46 |
| 6,561,908 | B1 | 5/2003 | Hoke | 463/35 |
| 6,638,169 | B2 * | 10/2003 | Wilder et al. | 463/35 |
| 6,676,514 | B1 | 1/2004 | Kusuda et al. | 463/24 |
| 6,684,060 | B1 * | 1/2004 | Curtin | 375/146 |
| 6,805,633 | B2 | 10/2004 | Hein, Jr. et al. | 463/35 |
| 6,843,725 | B2 | 1/2005 | Nelson | 463/40 |
| 6,848,996 | B2 | 2/2005 | Hecht et al. | 463/35 |
| 6,968,063 | B2 | 11/2005 | Boyd | 381/57 |
| 2002/0037763 | A1 | 3/2002 | Idaka | 463/16 |
| 2002/0039919 | A1 | 4/2002 | Joshi et al. | 463/20 |
| 2002/0090990 | A1 | 7/2002 | Joshi et al. | 463/20 |
| 2002/0142825 | A1 | 10/2002 | Lark et al. | 463/16 |
| 2002/0142846 | A1 | 10/2002 | Paulsen | 463/43 |
| 2002/0151349 | A1 | 10/2002 | Joshi | 463/20 |
| 2003/0054881 | A1 | 3/2003 | Hedrick et al. | 463/29 |
| 2003/0073490 | A1 * | 4/2003 | Hecht et al. | 463/35 |
| 2003/0073491 | A1 * | 4/2003 | Hecht et al. | 463/35 |
| 2003/0100359 | A1 * | 5/2003 | Loose et al. | 463/20 |
| 2003/0114214 | A1 * | 6/2003 | Barahona et al. | 463/20 |
| 2003/0211881 | A1 | 11/2003 | Walker et al. | 463/20 |
| 2004/0029637 | A1 | 2/2004 | Hein, Jr. et al. | 463/35 |
| 2004/0053695 | A1 | 3/2004 | Mattice et al. | 463/42 |
| 2004/0072610 | A1 * | 4/2004 | White et al. | 463/20 |
| 2004/0082388 | A1 | 4/2004 | Simsek et al. | 463/43 |
| 2004/0136553 | A1 * | 7/2004 | Lee et al. | 381/307 |
| 2004/0138889 | A1 | 7/2004 | Gilboy et al. | 704/270 |
| 2004/0142739 | A1 * | 7/2004 | Loose et al. | 463/20 |
| 2004/0142747 | A1 * | 7/2004 | Pryzby | 463/35 |
| 2004/0147316 | A1 | 7/2004 | Nagano | 463/35 |
| 2004/0161115 | A1 * | 8/2004 | Loose | 381/20 |
| 2005/0043090 | A1 * | 2/2005 | Pryzby et al. | 463/35 |
| 2005/0277469 | A1 * | 12/2005 | Pryzby et al. | 463/35 |
| 2005/0282631 | A1 * | 12/2005 | Bonney et al. | 463/35 |

FOREIGN PATENT DOCUMENTS

| | | |
|---|---|---|
| EP | 0981 119 A2 | 2/2000 |
| JP | 5031254 A2 | 2/1993 |
| JP | 10-277213 | 10/1998 |
| WO | 0977 856 | 12/1998 |
| WO | WO 01/05477 A2 | 1/2001 |
| WO | WO 01/05477 A3 | 1/2001 |
| WO | WO 01/33905 A2 | 5/2001 |
| WO | WO 10/39905 A3 | 5/2001 |
| WO | WO 02/24288 A2 | 3/2002 |
| WO | WO 02/24288 A3 | 3/2002 |
| WO | WO 02/040921 A3 | 5/2002 |

OTHER PUBLICATIONS

European Search Report for European Patent Application No. EP 04 00 0865, dated Oct. 6, 2004 (3 pages).

European Search Report for European Patent Application No. EP 04 00 0730, dated Oct. 11, 2004 (5 pages).

European Search Report for European Patent Application No. EP 04 00 3314, dated Oct. 13, 2004 (3 pages).

European Search Report for European Patent Application No. EP 04 00 0731, dated Oct. 14, 2004 (3 pages).

* cited by examiner

GAMING SYSTEM WITH SURROUND SOUND

RELATED APPLICATIONS

This application is being filed concurrently with U.S. patent application Ser. No. 10/342,720 entitled "Gaming Machine Environment Having Controlled Audio and Visual Media Presentation," U.S. patent application Ser. No. 10/342,817 entitled "Audio Network For Gaming Machines," and U.S. patent application Ser. No. 10/342,809 entitled "Player-Selectable Audio Preferences For A Gaming Machine," all of which are assigned to the assignee of the present application and all of which are incorporated herein by reference in their entireties.

FIELD OF THE INVENTION

The present invention relates generally to gaming system and, more particularly, to a gaming system with surround sound.

BACKGROUND OF THE INVENTION

Electronic gaming machines, such as mechanical reel slot machines, video slot machines, video poker machines, video bingo machines, video keno machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or perceived to be the same), players are most likely to be attracted to the most entertaining and exciting of the machines. Shrewd operators consequently strive to employ the most entertaining and exciting machines available because such machines attract frequent play and hence increase profitability to the operator.

To enhance a player's entertainment experience, electronic gaming machines often include special features such as enhanced payoffs, a "secondary" or "bonus" game which may be played in conjunction with a "basic" game, and attractive audio and/or visual effects accompanying the basic and bonus games. The bonus game may comprise any type of game, either similar to or completely different from the basic game, which is entered upon the occurrence of a selected event or outcome of the basic game. Generally, the bonus game provides a greater expectation of winning than the basic game. Further, attractive audio and/or visual effects accompany the basic and bonus games.

Because electronic gaming machines are an important source of income for the gaming industry, operators continually search for new gaming strategies and features to distinguish their electronic gaming machines from competitors in the industry and to provide additional incentives for players to play longer and to return to the casino on their next trip. Accordingly, there is a continuing need for manufacturers to provide new techniques for enhancing the entertainment experience involved in the play of electronic gaming machines. The present invention is directed to satisfying this need.

SUMMARY OF THE INVENTION

Accordingly, an electronic gaming system comprises a gaming terminal and a speaker arrangement. The gaming terminal conducts a wagering game. The speaker arrangement emits audio associated with the wagering game in surround sound relative to a player in front of the gaming terminal.

BRIEF DESCRIPTION OF THE DRAWINGS

The foregoing and other advantages of the invention will become apparent upon reading the following detailed description and upon reference to the drawings.

Figure 1:
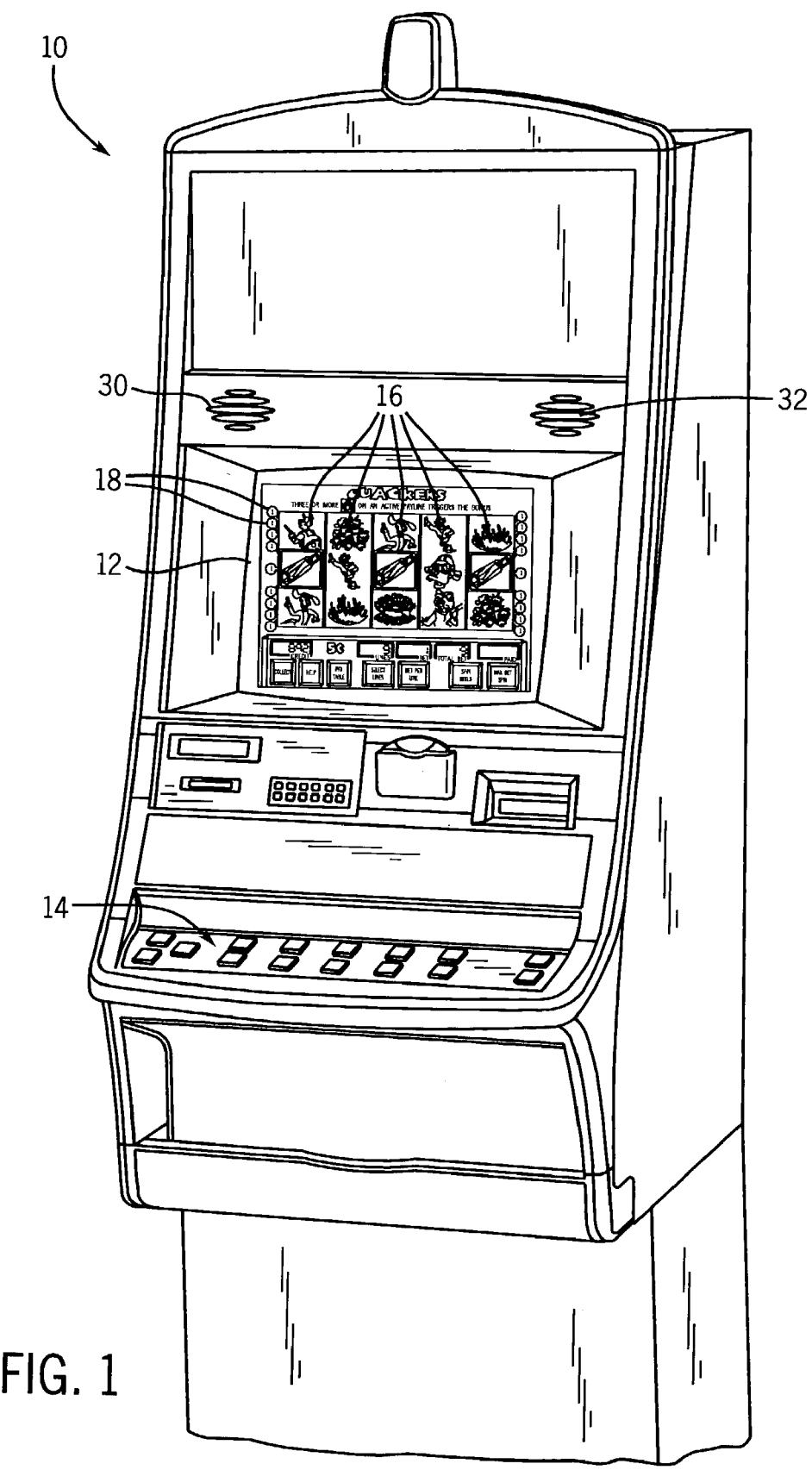
FIG. 1 is an isometric view of a gaming terminal for conducting a wagering game.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings, FIG. 1 depicts a gaming terminal 10 operable to conduct a wagering game such as slots, poker, keno, bingo, or blackjack. Generally, the terminal 10 receives a wager from a player to purchase a play of the game. In response, the terminal 10 generates at least one random event using a random number generator (RNG) and provides an award to the player for a winning outcome of the random event. Alternatively, the terminal 10 may be linked to a remote host computer that generates the random event and transmits the event's outcome to the terminal 10. To portray the outcome to the player, the terminal 10 includes a video display 12 as shown or a mechanical display. The video display 12 may be implemented with a CRT, LCD, plasma, or other type of video display known in the art. To allow the player to place wagers, make game selections, and otherwise operate the terminal 10, the terminal 10 includes a physical button panel 14 or a touch screen over the video display 12.

Figure 2A:
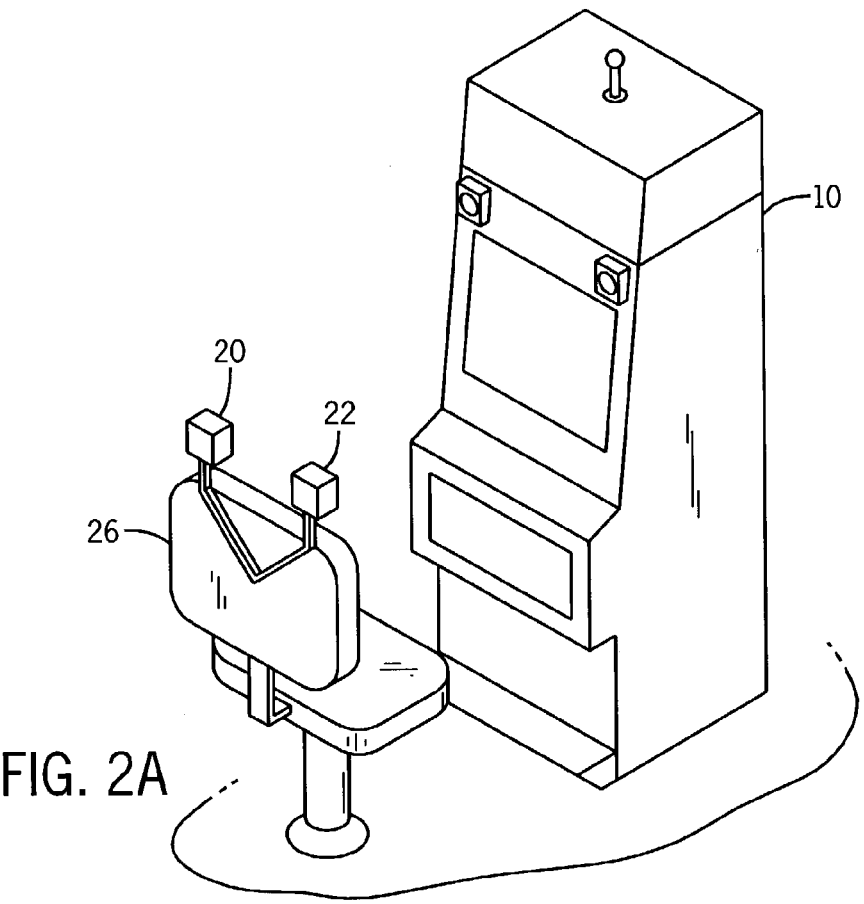
FIG. 2A is an isometric view of a gaming terminal with a speaker arrangement according to one embodiment of the present invention.
Figure 2B:
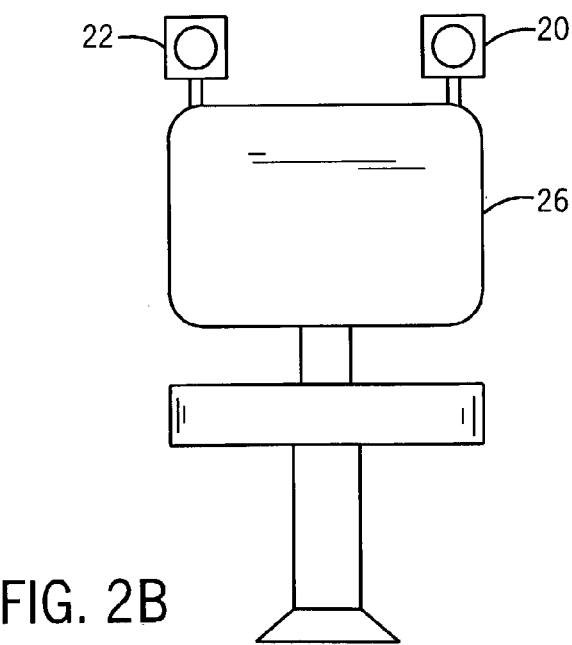
FIG. 2B is a front view of a chair and surround sound speakers shown in FIG. 2A.

Operation of the terminal 10 is described in greater detail below in the context of a video slot game. The video slot game is implemented on the video display 12 on a number of video simulated spinning reels 16 with a number of pay lines 18. Each of the pay lines 18 extends through one symbol on each of the reels 16. Generally, game play is initiated by inserting money or playing a number of credits, causing the terminal's central processing unit/CPU (see FIG. 2) to activate a number of pay lines corresponding to the amount of money or number of credits played. In one embodiment, the player selects the number of pay lines to play by pressing a "Select Lines" touch key on the display 12. The player then chooses the number of coins or credits to bet on the selected pay lines by pressing a "Bet Per Line" touch key.

After activation of the pay lines, the reels 16 may be set in motion by pressing a "Spin Reels" touch key or, if the player wishes to bet the maximum amount per line, by using a "Max Bet Spin" touch key on the display 12. Alternatively, other mechanisms such as a lever or push button may be used to set the reels in motion. The CPU uses a random number generator to select a game outcome (e.g., "basic" game outcome) corresponding to a particular set of reel "stop positions." The CPU then causes each of the video reels 16 to stop at the appropriate stop position. Video symbols are displayed on the reels 16 to graphically illustrate the reel stop positions and indicate whether the stop positions of the reels represent a winning game outcome.

Winning basic game outcomes (e.g., symbol combinations resulting in payment of coins or credits) are identifiable to the player by a pay table. In one embodiment, the pay table is affixed to the terminal 10 and/or displayed by the display 12 in response to a command by the player (e.g., by pressing a "Pay Table" touch key). A winning basic game outcome occurs when the symbols appearing on the reels 16 along an active pay line correspond to one of the winning combinations on the pay table. A winning combination, for example, could be three or more matching symbols along an active pay line, where the award is greater as the number of matching symbols along the active pay line increases. If the displayed symbols stop in a winning combination, the game credits the player an amount corresponding to the award in the pay table for that combination multiplied by the amount of credits bet on the winning pay line. The player may collect the amount of accumulated credits by pressing a "Collect" touch key. In one implementation, the winning combinations start from the first reel (left to right) and span adjacent reels. In an alternative implementation, the winning combinations start from either the first reel (left to right) or the fifth reel (right to left) and span adjacent reels.

Included among the plurality of basic game outcomes may be one or more start-feature outcomes for triggering play of special features. A start-feature outcome may be defined in any number of ways. For example, a start-feature outcome may occur when a special start-feature symbol or a special combination of symbols appears on one or more of the reels 16. The start-feature outcome may require the combination of symbols to appear along an active pay line, or may alternatively require that the combination of symbols appear anywhere on the display 12 regardless of whether the symbols are along an active pay line. The appearance of a start-feature outcome causes the CPU to shift operation from the video slot game to the special feature associated with that outcome.

In accordance with the present invention, the gaming terminal 10 includes a speaker arrangement for emitting multi-channel audio associated with the wagering game in surround sound relative to a player in front of the terminal 10. Surround sound refers to the use of sound to envelop the player, making the player feel like he or she is in the middle of the action. The multi-channel audio allows the player to hear sounds coming from around the player and may cause the player to become captivated in the game experience. The speaker arrangement for emitting the audio in surround sound includes both a "front" speaker arrangement and a "surround sound" speaker arrangement. Any speakers of the speaker arrangement may be linked to the terminal's CPU by speaker wire or a wireless connection.

There are several embodiments of the front speaker arrangement. In one embodiment shown in FIG. 1, the front speaker arrangement includes a left speaker 30 and a right speaker 32 mounted within a cabinet of the gaming terminal 10. In an alternative embodiment, the front speaker arrangement includes a single center speaker. In another alternative embodiment, the front speaker arrangement includes a left speaker, a right speaker, and a center speaker.

Figure 3:
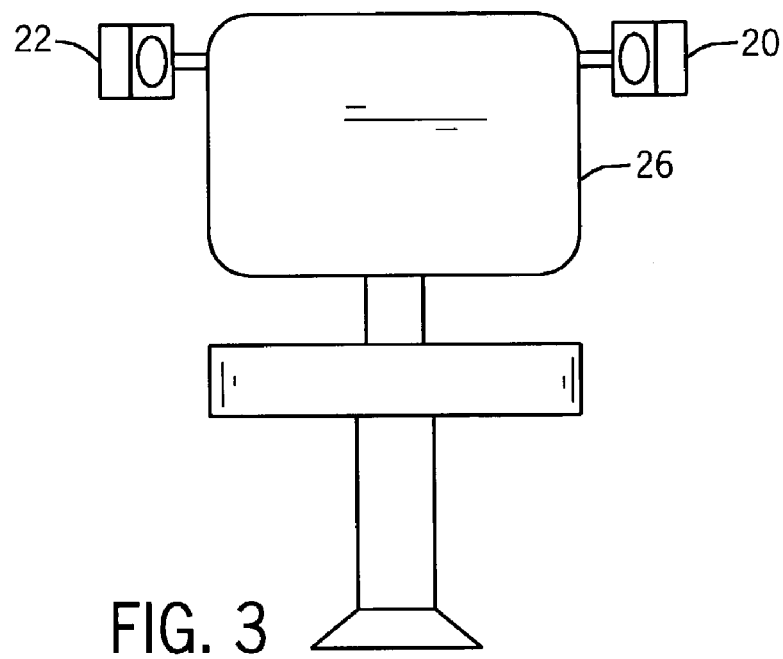
FIG. 3 is a front view of a chair and surround sound speakers according to another embodiment of the present invention.
Figure 4:
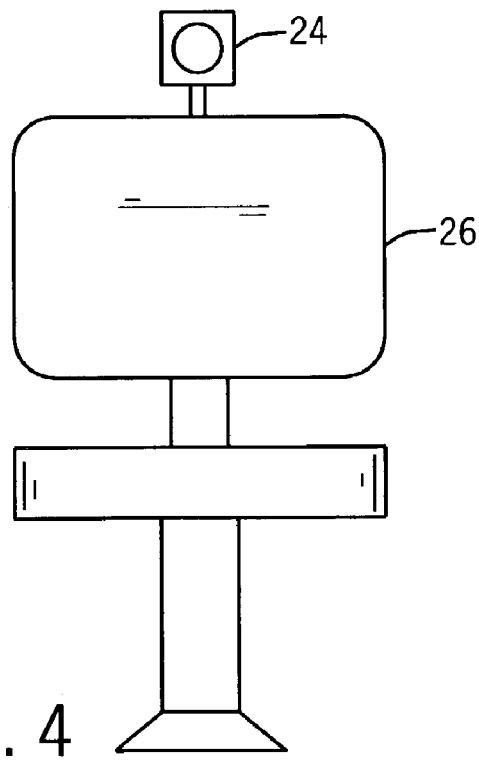
FIG. 4 is a front view of a chair and a surround sound speaker according to yet another embodiment of the present invention.

There are several embodiments of the surround sound speaker arrangement. In an embodiment shown in FIGS. 2A and 2B, the speaker arrangement includes a rear left speaker 20 and a rear right speaker 22 generally behind the player. A rear center speaker (see FIG. 4 for placement) is optional. The speakers 20 and 22 are mounted to a chair 26 on which the player can sit. In an alternative embodiment shown in FIG. 3, the speakers 20 and 22 are positioned generally on opposite sides of the player and remote from the terminal. In an alternative embodiment shown in FIG. 4, the speaker arrangement includes only a rear center speaker 24 generally behind the player.

Figure 5:
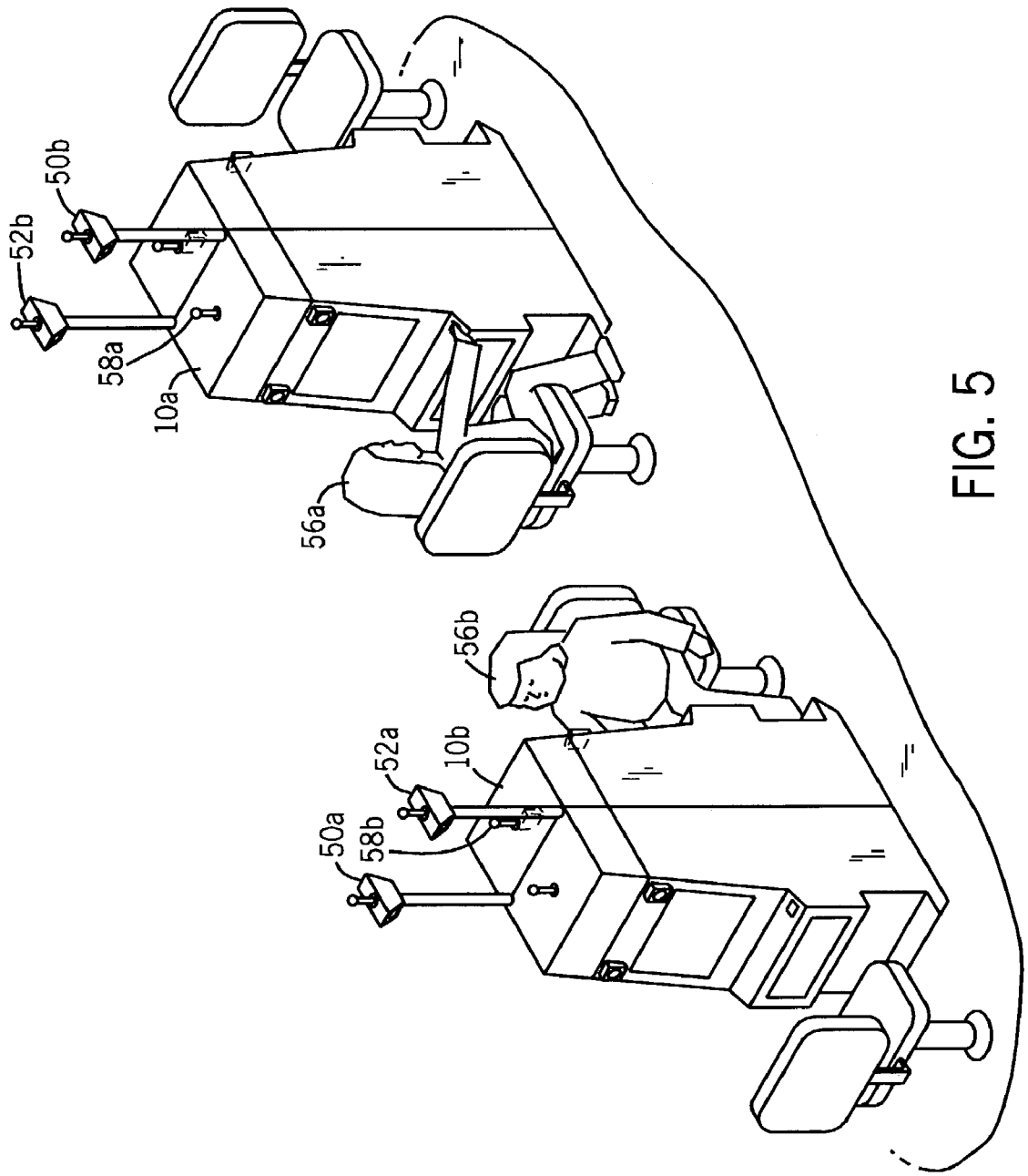
FIG. 5 is an isometric view of gaming terminals and a speaker arrangement according to a further embodiment of the present invention.
Figure 6:
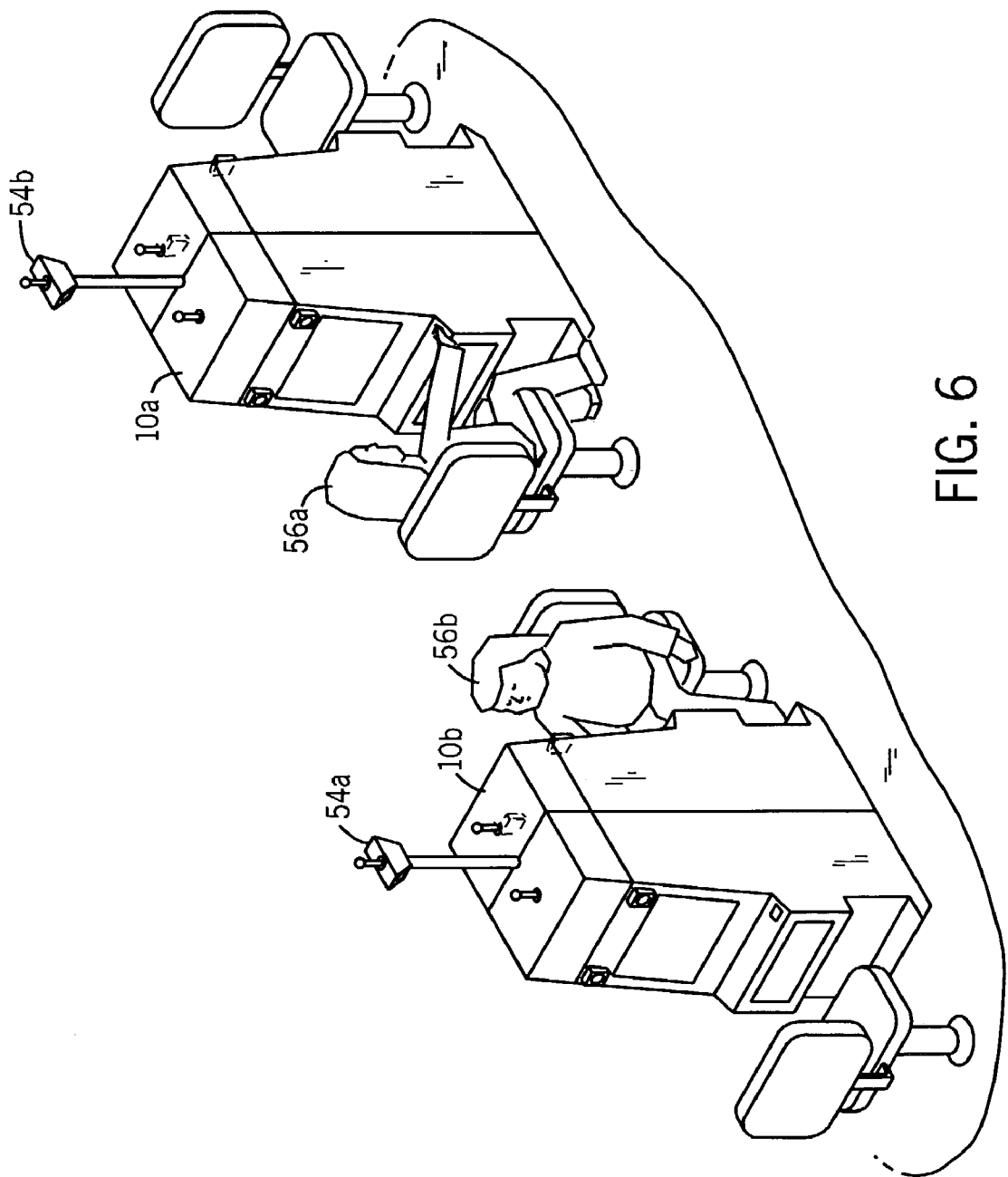
FIG. 6 is an isometric view of gaming terminals and a speaker arrangement according to another embodiment of the present invention.

In an embodiment shown in FIG. 5, the surround sound speaker arrangement includes a rear left speaker 50a, a rear right speaker 52a, and an optional rear center speaker (see FIG. 6 for placement) generally behind the player 56a at the terminal 10a. The speakers 50a and 52a are mounted above a second gaming terminal 10b positioned across an aisle from the terminal 10a used by the player 56a. The speakers 50a and 52a are "aimed" toward the player 56a to provide that player with surround sound. In a reciprocal manner, speakers 50b and 52b (and an optional rear center speaker) are mounted above the terminal 10a and aimed toward a player 56b to provide that player with surround sound. If the speakers are wireless, the terminals 10a and 10b are outfitted with respective wireless transmitters 58a and 58b for communicating audio signals to the speakers above the opposing terminal. In an alternative embodiment shown in FIG. 6, the speaker arrangement includes only a rear center speaker 54a generally behind the player 56a at the terminal 10a and a rear center speaker 54b generally behind the player 56b at the terminal 10b.

Figure 7:
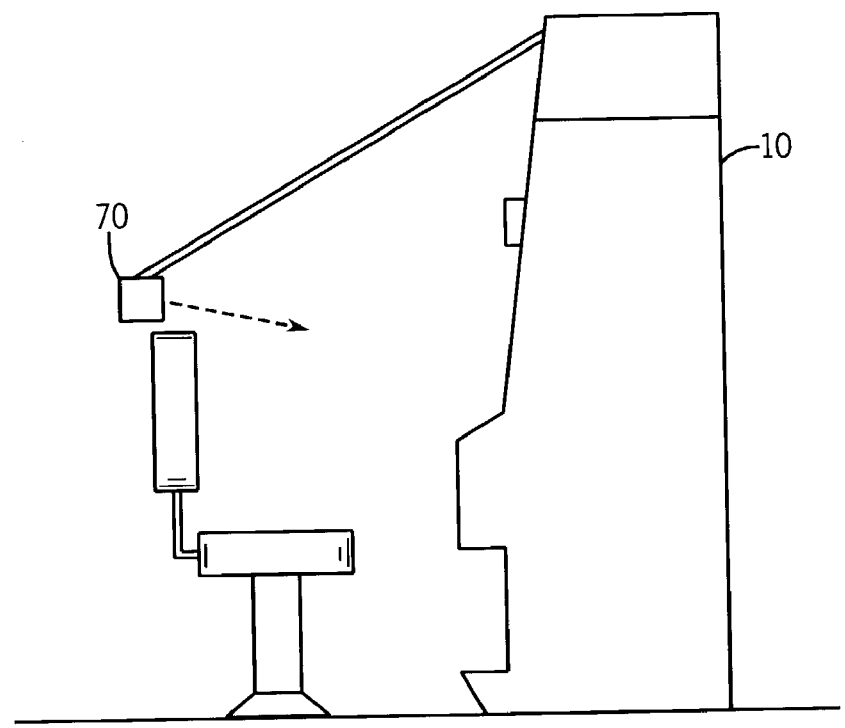
FIG. 7 is a side view of a gaming terminal and a speaker arrangement according to yet another embodiment of the present invention.

In an embodiment shown in FIG. 7, the surround sound speaker arrangement includes a rear left and right speakers 70 and an optional rear center speaker (not shown) The speakers 70 are mounted to the cabinet of the gaming terminal 10 and extend from the cabinet to a position behind or to a side of the player.

Figure 8:
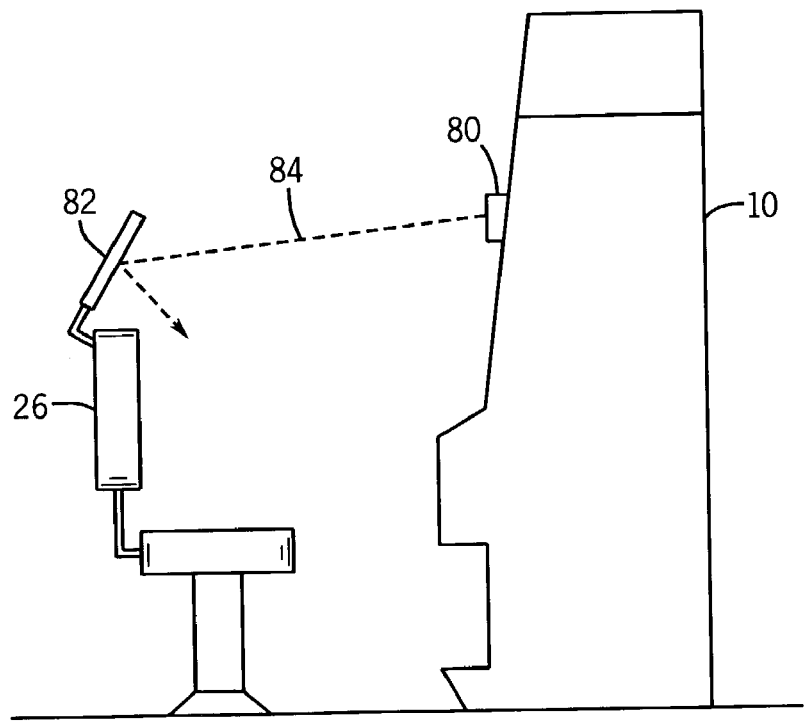
FIG. 8 is a side view of a gaming terminal and a speaker arrangement according to a further embodiment of the present invention.
Figure 9:
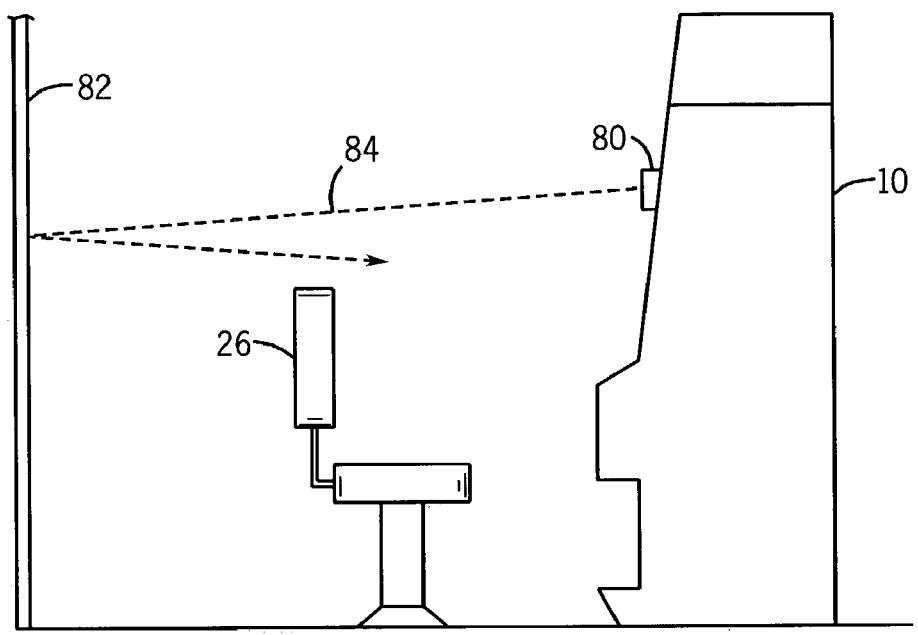
FIG. 9 is a side view of a gaming terminal and a speaker arrangement according to another embodiment of the present invention.

In an embodiment shown in FIGS. 8 and 9, the surround sound speaker arrangement includes one or more front speakers 80 (in addition to front speakers 30 and 32 in FIG. 1) and a remote reflective surface 82 behind or to the sides of the player. The reflective surface 82 may, for example, be mounted to the chair 26 as in FIG. 8 or to a structure behind the chair 26 as in FIG. 9. The speakers 80 aim concentrated sound beams 84 at the reflective surface 82. The player hears the reflected sound and perceives the sound as coming from behind him or her. Further details concerning this "virtual" speaker technology may be obtained from U.S. Pat. No. 6,229,899 to Norris et al., which is incorporated herein by reference in its entirety.

The speakers in the above embodiments generally provide full frequency response (e.g., from 20 Hz to 20,000 Hz). In addition to these speakers, the speaker arrangement may include another speaker, called a subwoofer, dedicated to lower frequency effects (e.g., 20 Hz to 120 Hz). The subwoofer may be placed anywhere near the terminal 10, including within the cabinet.

Figure 10:
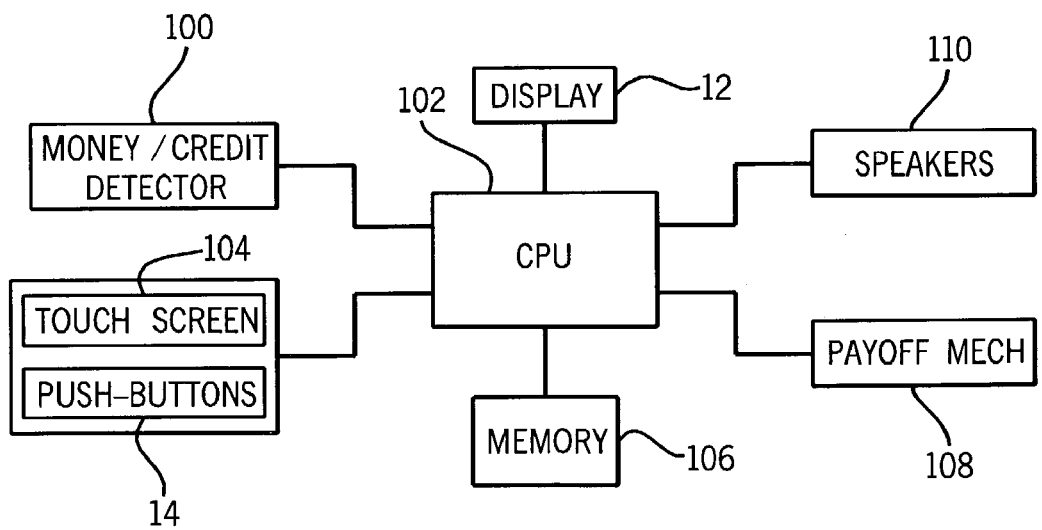
FIG. 10 is a block diagram of a control system suitable for operating a gaming terminal.

FIG. 10 is a block diagram of a control system suitable for operating the gaming terminal 10. Money/credit detector 100 signals the CPU 102 when a player has inserted money or played a number of credits. The money may be provided by coins, bills, tickets, coupons, cards, etc. Using a button panel 14 (see FIG. 1) or a touch screen 104, the player may select any variables associated with the wagering game (e.g., number of pay lines and bet per line in a video slot game) and place his/her wager to purchase a play of the game. In a play of the game, the CPU 102 generates at least one random event using a random number generator (RNG) and provides an award to the player for a winning outcome of the random event. The CPU 102 operates the display 12 to represent the random event(s) and outcome(s) in a visual form that can be understood by the player. In addition to the CPU 102, the control system may include one or more additional slave control units for operating additional video and/or mechanical displays.

Memory 106 stores control software, operational instructions and data associated with the gaming machine. In one embodiment, the memory 106 comprises read-only memory (ROM) and battery-backed random-access memory (RAM). The memory 106 may also include auxiliary memory for storing audio and/or video data. However, it will be appreciated that the memory 106 may be implemented on any of several alternative types of memory structures or may be implemented on a single memory structure. A payoff mechanism 108 is operable in response to instructions from the CPU 102 to award a payoff to the player. The payoff may, for example, be in the form of a number of credits. The number of credits are determined by one or more math tables stored in the memory 106.

The CPU 102 selects and processes audio data for producing the multi-channel audio to be emitted from speakers 110. The audio data may be stored in the memory 106 in any of various surround sound formats. The CPU 102 includes decoding circuitry and amplification circuitry suitable for the selected format. Alternatively, the decoding circuitry and the amplification circuitry may be located on a dedicated sound CPU board linked to the CPU 102. The decoding circuitry and the amplification circuitry may be located outside the gaming terminal 10; for example, the amplification circuitry may be located at the speakers 110 or anywhere between the gaming terminal 10 and the speakers 110. The speakers 110 are arranged according to the selected format. Examples of digital and analog surround sound formats are discussed below.

DOLBY DIGITAL™ (formerly Dolby AC-3) by Dolby Laboratories, Inc. is a digital surround sound format suitable for the audio data when it is stored in a digital section of the memory 106, such as on a DVD or laserdisc. DOLBY DIGITAL™ provides up to five discrete (independent) channels of full frequency effects (e.g., from 20 Hz to 20,000 Hz), plus an optional sixth channel dedicated to low frequency effects (e.g., from 20 Hz to 120 Hz). The five discrete channels include front center, front left, front right, surround left, and surround right. The center, front left, and front right channels generally carry dialogue, music, and sound effects, while the surround left and surround right channels provide surround sound and ambient effects. The sixth channel is usually reserved for a subwoofer speaker for reproducing the low frequency effects that may come with certain wagering games. During production, the audio data is stored in the memory 106 in DOLBY DIGITAL™ format, i.e., as compressed and encoded digital data. The stored digital data is encoded with information indicating the data stream to be transmitted through each sound channel. The CPU 102 includes a digital surround sound decoder that, during playback, decodes the stored digital data into multiple data streams transmitted through the sound channels.

An extended surround version of DOLBY DIGITAL™, called DOLBY DIGITAL EX™ or SURROUND EX™, encodes the audio data with a third surround channel (i.e., surround back channel) that can be decoded for playback over a rear center speaker placed behind the player. Using matrix encoding technology, the surround back channel information is encoded into the surround left and right channels during production and later decoded (or derived) from the surround left and right channels during playback. Because of this matrix encoding scheme, the surround back channel is not a true discrete channel. This allows certain audio effects to be presented behind the player, thereby achieving more enveloping and complete 360° surround sound.

DTS DIGITAL SURROUND™ by Digital Theatre Systems, Inc. is a competing and alternative digital surround sound format to DOLBY DIGITAL™. Like DOLBY DIGITAL™, DTS DIGITAL SURROUND™ provides up to five discrete channels of full frequency effects, plus an optional sixth channel dedicated to low frequency effects. DTS DIGITAL SURROUND™, however, offers higher data rates, and therefore uses more of the capacity of the memory 106, than DOLBY DIGITAL™.

An extended surround version of DTS DIGITAL SURROUND™, called DTS-ES MATRIX™, encodes the audio data with a third surround channel (i.e., surround back channel) that can be decoded for playback over a rear center speaker placed behind the player. Yet another extended surround version of DTS DIGITAL SURROUND™, called DTS-ES DISCRETE 6.1™, supports a fully discrete surround back channel. That is, the surround back channel has it own data stream and is truly independent from those of the surround left and right channels.

DOLBY PRO-LOGIC™ by Dolby Laboratories, Inc. is an analog surround sound format that encodes four channels of audio information onto two stereo analog channels during production. The encoded two-channel audio data is stored in an analog section of the memory 106, such as on a Hi-Fi VHS tape. The four channels include front center, front left, front right, and mono surround. The front center channel, among other things, "anchors" any dialogue in a wagering game to the image shown on the video display 12. The CPU 102 includes an analog surround sound decoder that, during playback, uses a technique called matrixing to derive the front center channel and surround sound channel from the encoded two-channel audio data stored in the memory 106. The surround channel is limited in bandwidth to frequencies from 100 Hz to 7,000 Hz.

DOLBY SURROUND™ by Dolby Laboratories, Inc. is an analog surround sound format that encodes three channels of audio information onto two stereo analog channels. The three channels includes front left, front right, and surround. Relative to DOLBY PRO-LOGIC™, DOLBY SURROUND™ gives up the front center channel along with some degree of fidelity in the surround channel.

Figure 11:
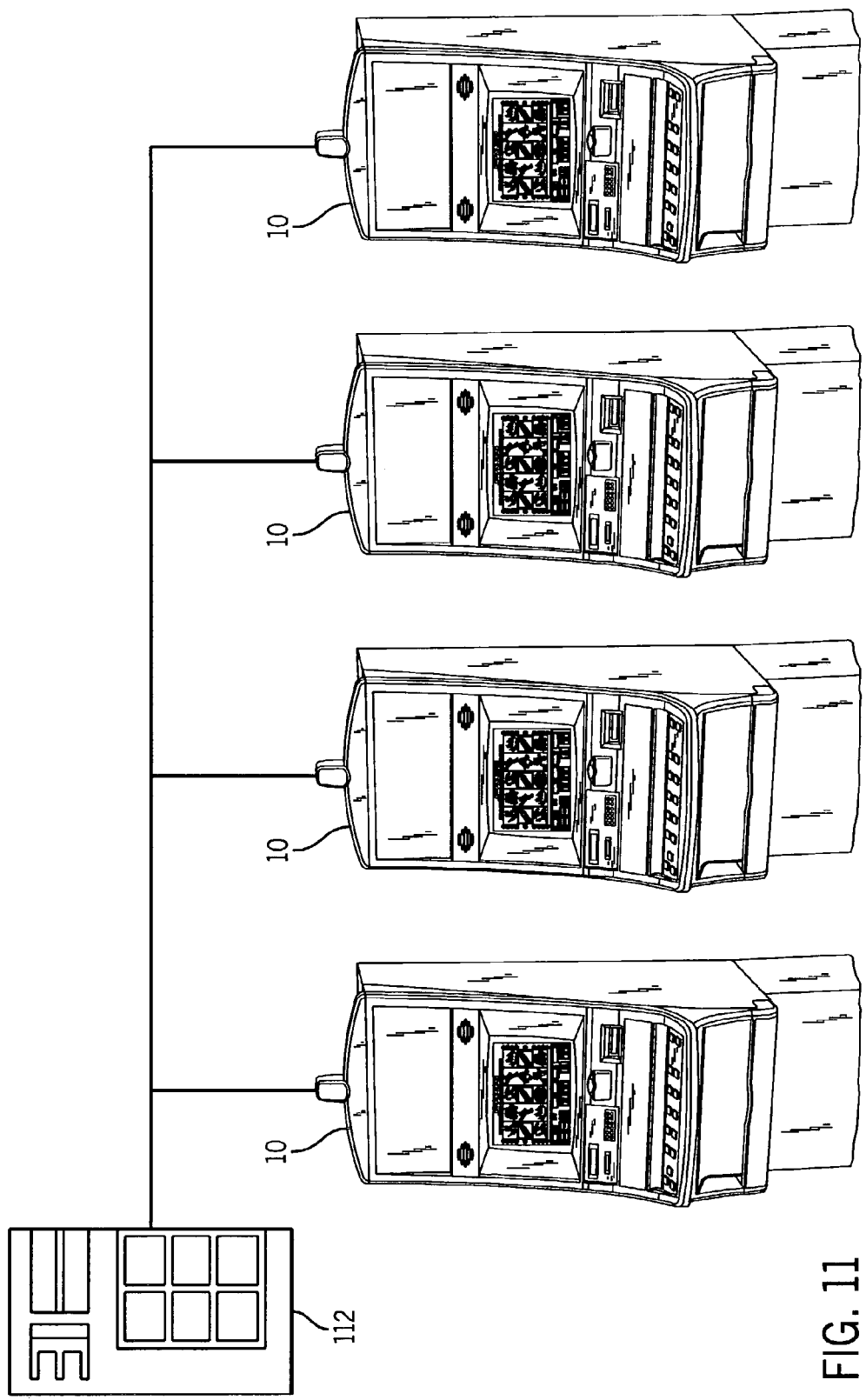
FIG. 11 illustrates a gaming system architecture in which a bank of gaming machines are connected to a host computer.

In the above-described embodiments, the CPU 102 for selecting audio data to be processed and played back is located at the gaming terminal 10. In an alternative embodiment shown in FIG. 11, the gaming terminal 10 and a plurality of other gaming terminals are linked to a remote host computer 112 over a network such as an Ethernet-based local area network (LAN). The terminal 10 may, in turn, select and process audio data and video data from its memory 106 representative of a wagering game outcome. The game outcome may be determined at the host computer 112 or locally at the terminal 10. Alternatively, the host computer 112 may transmit audio and/or video content to the terminal 10, which in turn receives, processes (e.g., decodes and amplifies), and plays back the received content. The transmitted content may be streamed so that the terminal 10 can start playing the content before the entire file has been transmitted. For streaming to work, the terminal 10 must be able to collect the content and send it as a steady stream to the application that is processing the data and converting it to sound or images. If the streaming terminal 10 receives the content more quickly than required, it saves the excess content in a buffer.

The performance, listening environment, and physical locations of the surround sound speakers may vary in different installations. For example, with respect to the embodiments shown in FIGS. 5 and 6, in one installation the surround sound speakers may be located about seven feet off the ground and about ten feet from the terminal 10 for which they are providing surround sound. In another installation the surround sound speakers may be located about eight off the ground and about twelve feet from the terminal 10. The variable locations may adversely impact the effectiveness of the speakers in providing surround sound. Accordingly, to counteract this potential issue and create the optimum acoustical experience for players, the terminal 10 may offer operator-selectable, audio configuration options. An operator can access the configuration options and current settings for each option via an onscreen setup menu. The configuration options may, for example, include the following:

SPEAKER BALANCE ADJUSTMENT: This operation uses an internal test-tone generator for balancing the levels of the front and surround sound speakers. The operator performs this adjustment of each speaker output level while situated at a player's typical playing position. To initiate the adjustment process, the operator may press an onscreen "test" key. In response, a hiss-like calibration tone is heard in sequence from the speakers included in the speaker arrangement. In a five speaker arrangement, for example, the calibration tone is heard in sequence from the front left speaker, the front center speaker, the front right speaker, the rear right speaker and the rear left speaker. The state of the calibration tone output is shown in the video display 12 of the terminal 10. During the calibration tone sequence, the operator can select any speaker whose output level the operator wishes to adjust and can adjust the level of the selected speaker by pressing onscreen +/− keys. While making an adjustment to a selected speaker, the calibration tone is fixed on the selected speaker.

SURROUND BALANCE CONTROL: Adjusts the left and right output level of the surround sound speakers to compensate for sound imbalance caused by speaker positions or listening environment conditions.

SURROUND SWITCH: Normally on, the operator can turn this switch off to disable output from any surround sound speakers and re-distribute any surround sound signals to the front speakers.

DELAY TIME: The operator can adjust the time difference (i.e., delay time) between the beginning of the sound from the front speakers and the beginning of the effect sound from the surround sound speakers. The larger the value, the later the effect sound is generated. The control range may, for example, be 0 to 50 milliseconds (ms) in 1 ms steps. The operator can adjust the delay time by pressing onscreen "+/−" keys.

SURROUND SOUND SPEAKER SIZE: The operator can define the size of the surround sound speakers to be small or large. The factory preset position is small. In the small position, low bass signals (e.g., below 90 Hz) at the surround sound channels are instead output from a low frequency effects (LFE) channel if the LFE channel exists in the utilized surround sound format. In the large position, full range signals (including low bass signals) are output from the surround sound channels.

SURROUND SPEAKER HEIGHT: The vertical distance of each surround sound speaker off the ground. The setup screen may offer a number of heights (e.g., in feet) from which the operator makes a selection.

SURROUND SPEAKER DISTANCE: The horizontal distance of each surround sound speaker from the gaming terminal. The setup screen may offer a number of distances (e.g., in feet) from which the operator makes a selection. Based on the selected surround speaker height and distance, the CPU 102 automatically adjusts the volume level at the surround sound channels.

IMPEDANCE: The operator can set the CPU's amplifier for either 4 or 8-ohm speakers.

MASTER VOLUME: The operator can simultaneously control the output level of all sound channels. In one embodiment, the operator can set the volume to mute (off), low, medium, or high. In another embodiment, the operator can set the volume to anywhere between mute and high.

BASS CONTROL: The operator can adjust the low frequency response for the front sound channels.

BASS EXTENSION CONTROL: When this switch is turned on, the CPU 102 boosts the bass frequency response at the front sound channels while maintaining overall tonal balance.

TREBLE CONTROL: The operator can adjust the high frequency response for the front sound channels.

TONE BYPASS SWITCH: The operator can bypass the bass and treble controls and provides a flat, pure signal. When this switch is turned on, the audio input signal does not pass through the tone control circuitry of the CPU 102 so that it is unaffected by the tone control circuitry.

DYNAMIC RANGE: Dynamic range is the difference between the maximum level and the minimum level of sounds. The operator can set the dynamic range to maximum, standard, or minimum. The factory preset position is maximum. This option is effective only when the audio data is stored in the memory 106 in a digital surround sound format.

LFE LEVEL: The operator can set the LFE level of the LFE channel between −20 dB and 0 dB in 1 dB steps. The factory preset position is 0 dB. This option is effective only when the audio data is stored in the memory 106 in a digital surround sound format and produces LFE signals when decoded by the CPU 102.

SOUND FIELD: The operator can select a digital signal processing (DSP) program to be used by the CPU 102 for processing the audio data retrieved from the memory 106. The DSP programs produce different sound fields that are digital recreations of actual acoustic environments. Examples of sound fields include movie theater, sports, stadium, disco, rock concert, jazz club, church, and concert hall. The sound field may, for example, be selected according to the theme of the wagering game conducted on the gaming terminal.

SOUND SCHEME: The operator can set the sound scheme to either a thematic sound scheme or a standard sound scheme. The thematic sound scheme utilizes sounds related to the theme of the wagering game. The standard sound scheme utilizes generic sounds, i.e., sounds unrelated to the theme of the wagering game.

The configuration options allow an operator to configure the terminal 10 to optimize the acoustical experience for players. In addition to configuration options that can be changed via a setup menu, the terminal provider may define technical parameters regarding recommended placement of terminals 10 and surround sound speakers. To the extent the surround sound speakers can "point" in different directions, the technical parameters may also include recommended angles of the surround sound speakers. An installation manual for the terminal may define the technical parameters.

While the present invention has been described with reference to one or more particular embodiments, those skilled in the art will recognize that many changes may be made thereto without departing from the spirit and scope of the present invention. For example, instead of true surround sound that relies upon a surround channel delivering audio to a speaker behind or to the side of a player, the present invention also contemplates "virtual" (3D) surround sound. Virtual surround sound relies upon virtual surround sound algorithms, such as QSound™ by QSound Labs, Inc., SRS™ (Sound Retrieval System) by SRS Labs, Inc., and other proprietary algorithms, which make use of only front left and right speakers and psycho-acoustics effects to emulate true surround sound formats. Each of these embodiments and obvious variations thereof is contemplated as falling within the spirit and scope of the claimed invention, which is set forth in the following claims:

What is claimed is:

1. A method of operating a gaming terminal, comprising:
   conducting a wagering game via a gaming terminal;
   producing multi-channel audio using audio circuitry associated with the wagering game; and
   emitting multi-channel audio associated with the wagering game in surround sound relative to a player in front of the gaming terminal such that the player perceives action and associated sound of the wagering game as occurring around the player, the surround sound audio being emitted using a speaker arrangement having at least one cabinet speaker that is mounted to a cabinet housing of the gaming terminal and at least one chair speaker that is mounted to a chair on which the player sits for conducting the wagering game, a first channel of the multi-channel audio associated with the wagering game being transmitted through the at least one cabinet speaker and a second channel of the multi-channel audio associated with the wagering game being transmitted through the at least one chair speaker.

2. The method of claim 1, wherein the at least one chair speaker includes left and right speakers generally behind the player.

3. The method of claim 2, wherein the at least one chair speaker includes a center speaker generally behind the player.

4. The method of claim 1, wherein the at least one chair speaker includes left and right speakers generally on opposite sides of the player.

5. The method of claim 4, wherein the at least one chair speaker includes a center speaker generally behind the player.

6. The method of claim 1, wherein the multi-channel audio includes a discrete surround left channel and a discrete surround right channel.

7. The method of claim 1, wherein the multi-channel audio includes a discrete surround left channel, a discrete surround right channel, and a discrete surround back channel.

8. The method of claim 1, wherein the at least one cabinet speaker extends from the cabinet to a position behind or to a side of the player.

9. The method of claim 1, further including controlling the audio with a central processing unit of the gaming terminal.

10. The method of claim 1, further including controlling the audio with a host computer linked to the gaming terminal over a network.

11. The method of claim 1, further including decoding a single encoded data stream into multiple data streams transmitted through channels of the multi-channel audio.

12. The method of claim 11, wherein the single encoded data stream is encoded with information indicating the audio to be emitted from each speaker of the speaker arrangement.

13. An electronic gaming system comprising:
    a gaming terminal for conducting a wagering game, the gaming terminal including a cabinet housing;
    a chair on which the player sits for conducting the wagering game; and
    a speaker arrangement for emitting multi-channel audio associated with the wagering game in surround sound relative to the player in front of the gaming terminal such that the player perceives action and associated sound of the wagering game as occurring around the player, the speaker arrangement including at least one cabinet speaker mounted to the cabinet housing and at least one chair speaker positioned behind a listening position of the player and mounted to the chair, the cabinet speaker emitting a first channel of the multi-channel audio, the chair speaker emitting a second channel of the multi-channel audio.

14. The system of claim 13, wherein the at least one chair speaker includes left and right speakers.

15. The system of claim 14, wherein the at least one chair speaker includes a center speaker.

16. The system of claim 13, wherein the at least one chair speaker includes left and right speakers generally on opposite sides of the player.

17. The system of claim 16, wherein the at least one chair speaker includes a center speaker.

18. The system of claim 13, wherein the multi-channel audio includes a discrete surround left channel and a discrete surround right channel.

19. The system of claim 13, wherein the multi-channel audio includes a discrete surround left channel, a discrete surround right channel, and a discrete surround back channel.

20. The system of claim 13, wherein the speaker arrangement includes a speaker mounted to another gaming terminal positioned generally behind the player.

21. The system of claim 13, wherein the at least one cabinet speaker extends from the cabinet to a position behind or to a side of the player.

22. The system of claim 13, further including a central processing unit for controlling the audio, the central processing unit being located at the gaming terminal.

23. The system of claim 13, further including a central processing unit for controlling the audio, the central processing unit being located at a host computer linked to the gaming terminal over a network.

24. The system of claim 13, further including a decoder for decoding a single encoded data stream into multiple data streams transmitted through channels of the multi-channel audio.

25. The system of claim 24, wherein the single encoded data stream is encoded with information indicating the audio to be emitted from each speaker of the speaker arrangement.

26. An electronic gaming system for conducting a wagering game, the electronic gaming system comprising:
a media storage unit for storing audio data in a surround sound format, the audio data producing audio associated with a wagering game;
a speaker emitting the audio in front of a player of the wagering game, the speaker being mounted within a cabinet housing of the electronic gaming system,
a reflective surface mounted to a chair on which the player sits for conducting the wagering game, the reflective surface being constructed and arranged to reflect the audio emitted from the speaker and direct the audio towards the player such that the player perceives action and associated sound of the wagering game as occurring around the player; and
a processing unit for decoding the audio data and coupled to the speaker.

27. The system of claim 26, wherein the surround sound format is digital.

28. The system of claim 26, wherein the surround sound format is analog.

29. The system of claim 26, wherein the stored audio data is encoded with audio information for a plurality of sound channels, the processing unit decoding the audio data into the plurality of sound channels.

30. The system of claim 29, wherein the plurality of sound channels include at least one surround sound channel.

31. The system of claim 29, wherein the plurality of sound channels include at least four discrete sound channels.

32. The system of claim 31, wherein the at least four discrete sound channels include front left, front right, surround left, and surround right.

33. The system of claim 26, wherein the stored audio data includes audio information for at least one surround channel encoded onto audio information for at least one non-surround channel, the processing unit using matrix decoding to derive the audio information for the surround channel from the audio information for the non-surround channel.

34. The system of claim 26, wherein the processing unit decodes the audio data into at least one surround sound channel.

35. A method of operating a gaming system, comprising:
storing audio data associated with a wagering game in a surround sound format;
decoding the audio data; and
outputting multi-channel audio based on the audio data using a plurality of speakers such that the player perceives action and associated sound of the wagering game as occurring around the player, at least one of the plurality of speakers transmitting a first channel of the multi-channel audio associated with the wagering game and being located in a chair in which the player of the wagering game sits for conducting the wagering game, the chair being located in front of a gaming terminal of the gaming system, another one of the plurality of speakers transmitting a second channel of the multi-channel audio associated with the wagering game and being located in a cabinet of the gaming terminal.

36. The method of claim 35, wherein the surround sound format is digital.

37. The method of claim 35, wherein the surround sound format is analog.

38. The method of claim 35, further including encoding the audio data with audio information for channels of the multi-channel audio and wherein the decoding step includes decoding the audio data into the channels.

39. The method of claim 38, wherein the channels of the multi-channel audio includes at least four discrete sound channels, the first channel being one of the four discrete sound channels, the second channel being another one of the four discrete sound channels.

40. The method of claim 39, wherein the at least four discrete sound channels include front left, front right, surround left, and surround right.

41. The method of claim 35, further including encoding audio information for at least one surround channel of the multi-channel audio onto audio information for at least one non-surround channel, and wherein the decoding step includes using matrix decoding to derive the audio information for the at least one surround channel from the audio information for the non-surround channel.

42. The method of claim 35, wherein the decoding step includes decoding the audio data into at least one surround sound channel of the multi-channel audio.

* * * * *